(12) United States Patent
Yamauchi

(10) Patent No.: US 6,547,960 B1
(45) Date of Patent: Apr. 15, 2003

(54) OIL SEPARATING APPARATUS FOR OIL CONTAINING SUBSTANCE AND METHOD THEREFOR

(76) Inventor: Hajime Yamauchi, 1877-6, Kashiwabara Aza Mukaihara, Shinano-machi, Kamiminochi-gun, Nagano (JP)

( * ) Notice: Subject to any disclaimer, the term of this patent is extended or adjusted under 35 U.S.C. 154(b) by 0 days.

(21) Appl. No.: 09/707,497
(22) Filed: Nov. 7, 2000
(30) Foreign Application Priority Data Nov. 29, 1999 (JP) ............................................ 11-336993

(51) Int. Cl.⁷ ................................................. C10G 1/00
(52) U.S. Cl. ........................ 208/424; 208/425; 208/428; 208/391
(58) Field of Search ................................ 208/424, 425, 208/428, 391, 113; 196/98, 127, 140

(56) References Cited

U.S. PATENT DOCUMENTS

| | | | |
|---|---|---|---|
| 1,497,607 A | * 6/1924 | Streppel | 208/391 |
| 4,687,569 A | * 8/1987 | Patzer et al. | 208/391 |
| 5,584,986 A | * 12/1996 | Bartholic | 208/113 |

* cited by examiner

Primary Examiner—Walter D. Griffin
(74) Attorney, Agent, or Firm—Dickstein, Shapiro, Morin & Oshinksky, LLP.

(57) ABSTRACT

An oil component separating apparatus for an oil containing substance can solve a problem of inflammability and can separate oil component and solid substance simply at low cost. The oil component separating apparatus for a oil containing substance includes a processing vessel having an injection space, into which a supersonic flow of an overheated vapor is injected toward an oil containing substance supplied externally, separating means for separating a evaporated component and solid component obtained by injection in the injection space, and condensing means for collecting the oil component by condensing the evaporated substance.

4 Claims, 2 Drawing Sheets

OIL SEPARATING APPARATUS FOR OIL CONTAINING SUBSTANCE AND METHOD THEREFOR

BACKGROUND OF THE INVENTION

1. Field of the Invention

The present invention relates generally to an oil separating apparatus for an oil containing substance and a method therefor. More particularly, the invention relates to an oil separating apparatus for separating an oil component and a solid substance from an oil containing substance, and a method therefor.

2. Description of the Related Art

Typical oil containing substances are oil sand or oil sludge, in a field of semiconductor fabrication technology, a silicon sludge generated during slice cutting of a silicon ingot, or, in a field of automotive vehicle manufacturing technology, an oil containing polishing sludge or the like. The oil sand has a huge amount of deposits in nature. Therefore, there is a demand for performing oil refining from the oil sand to separate and collect petroleum oil.

On the other hand, it is quite important in viewpoint of environmental protection to separate an oil component and a solid substance from the silicon sludge or oil containing polishing sludge. There is a strong demand therefor from industrial world. However, what is practically performed is to evaporate the oil component by combustion and to dispose the solid substance, which goes against the current of the times. Particularly, $NO_x$ and $SO_x$ contained in combustion exhaust is becoming social problem.

Therefore, attempt has been made to separate the oil component and solid substance from the oil containing substance. It is typical to perform drying process or distillation process in this case.

For drying or distillation of the oil containing substance, evaporation process is performed. In such evaporation process, inflammability becomes a problem. On the other hand, facilities and methods for separating crude oil from the oil sand which is estimated to have comparable amount of deposits as that of crude oil, on the earth, also faces the problem of inflammability. It is also required facilities and methods of low cost and high efficiency with lowered profitable line of business.

SUMMARY OF THE INVENTION

Therefore, it is an object of the invention to provide a oil component separating apparatus for an oil containing substance and a method therefor which can solve a problem of inflammability and can separate oil component and solid substance simply at low cost.

According to one aspect of the present invention, an oil component separating apparatus for a oil containing substance comprises:
a processing vessel having an injection space, into which a supersonic flow of an overheated vapor is injected toward an oil containing substance supplied externally;
separating means for separating a evaporated component and solid component obtained by injection in the injection space; and
condensing means for collecting the oil component by condensing the evaporated substance.

The processing vessel may have a nozzle which is supplied the high temperature and high pressure supersonic flow of the overheated vapor and injects the supersonic flow of the overheated vapor in to the injection space.

The separating means may be a cyclone or bag filter which separates and collects the solid component, the evaporated component may be dispersed by the cyclone or bag filter to be supplied by the condensing means, and the condensing means may perform cooling and distillation of the evaporated component by heat exchanging process.

The heat exchanging process of the condensing means is a cooling process by a cooling water, and a moisture component obtained by the cooling process is re-used as the cooling water.

The moisture component obtained by the cooling process may be re-used for generating overheated vapor of high temperature and high pressure.

According to another aspect of the present invention, an oil component separating method for a oil containing substance comprises:
a step of injecting an overheated vapor toward an oil containing substance supplied externally in an injection space;
a step of separating a evaporated component and solid component obtained by injection in the injection space; and
a step of collecting the oil component by condensing the evaporated substance.

In the separating step, the solid component may be separated and collected by a cyclone or bag filter, the evaporated component may be dispersed by the cyclone or bag filter to be supplied to the condensing step, and in the condensing step, the evaporated component may be subject to cooling and distillation of by heat exchanging process.

The heat exchanging process in the condensing step may be a cooling process by a cooling water, and a moisture component obtained by the cooling process is re-used as the cooling water.

The moisture component obtained by the cooling process may be re-used for generating overheated vapor of high temperature and high pressure.

In the operation of the oil component separating apparatus, the overheated steam of high temperature and high pressure is injected within the processing vessel as supersonic flow through the throat form nozzle, and on the other hand, the oil containing substance is supplied to the processing vessel by the feeder. Accordingly, in the processing vessel, the overheated steam of supersonic flow is forcedly collided to the oil containing substance to instantly crush and evaporate the latter. The solid substance is separated by means of cyclone through centrifugal separation or the like. The evaporated oil component is dispersed and subject to heat exchange (by condenser or the like in step by step to be cooled and distilled. The whole apparatus is filled with water vapor to keep in oxygen free condition to avoid fear of inflaming to assure safety. Also, scale on the piping is hardly hardened to facilitate maintenance.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details.

Figure 1:
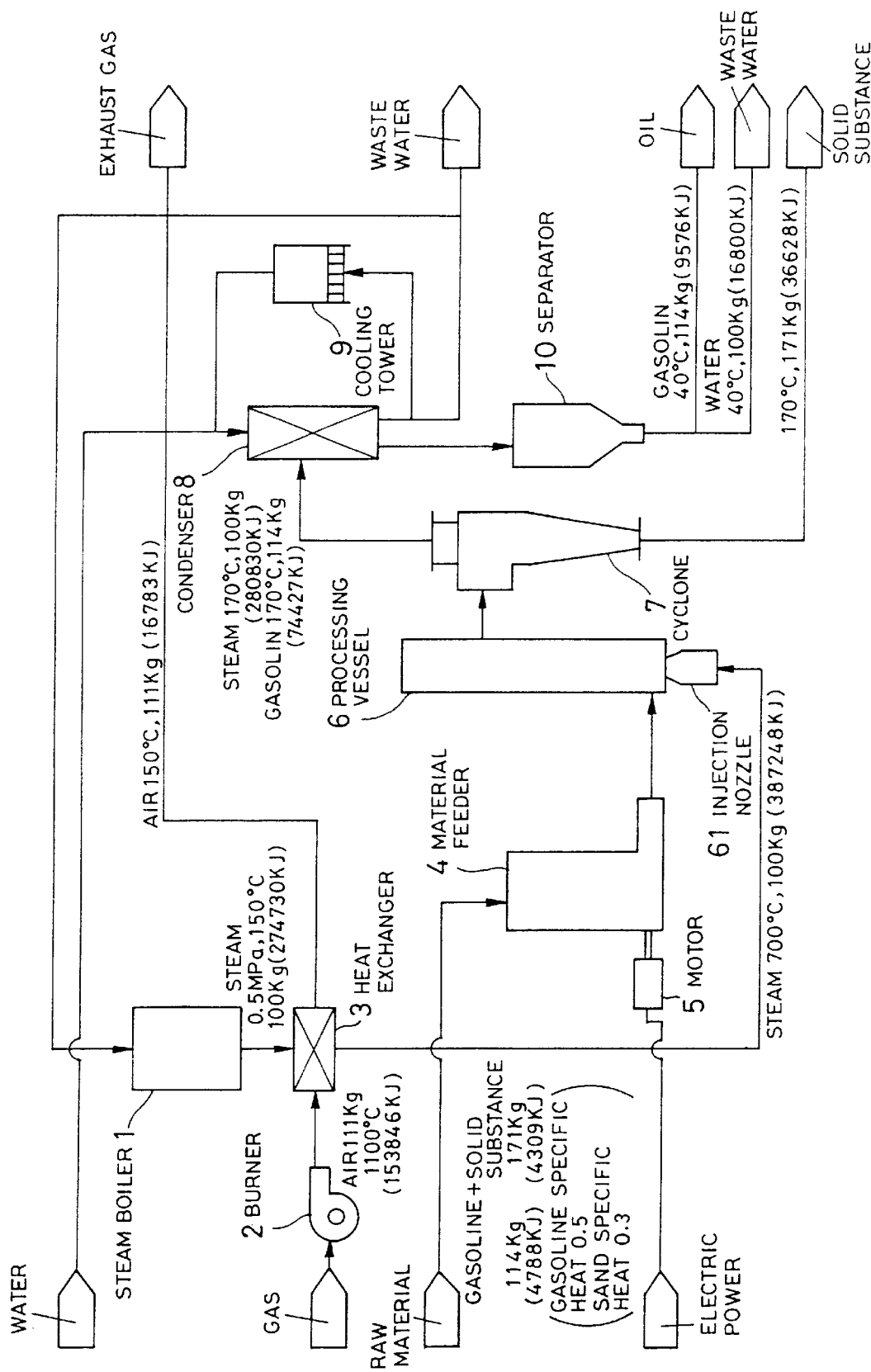
FIG. 1 is a diagrammatic illustration showing a general construction of the preferred embodiment of an oil component separating apparatus according to the present invention.

FIG. 1 is a diagrammatic illustration showing a general construction of the preferred embodiment of an oil component separating apparatus according to the present invention. Referring to FIG. 1, a steam boiler 1 is to obtain a water vapor (pressurized gas). A burner 2 is for heating the water vapor obtained from the steam boiler 1. The burner 2 may be driven by an oil, a gas, an electricity or the like. A heat exchanger 3 is a device for transferring a heat generated by the burner 2 to the water vapor.

A material feeder 4 is for sequentially feeding an oil containing substance (raw material) to a processing vessel 6 by means of a screw feeder or a pump (not shown). A motor 5 drives the screw feeder or the pump. The processing vessel 6 crushes the supplied oil containing substance and evaporates the coil component with stirring. The water vapor of elevated temperature and pressure by the steam boiler 1 and the heat exchanger 3 passes through a throat form injection nozzle 61 to be formed into a supersonic flow to be injected into an injection space in the processing vessel to be forcedly collide with the supplied oil containing substance.

A cyclone 7 is for separating a vaporized substance and a solid substance obtained in the processing vessel. A gravity separator, a collision separator, a bag filter and so forth may also be used for separating the vaporized substance and the solid substance. A condenser 8 cools and distillates the vaporized substance separated by the cyclone 7, namely, water vapor and oil vapor, by a heat exchanging process. A cooling tower 9 cools a hot water separated and discharged from the condenser 8 to re-circulate as a cooling water.

A separating vessel (separator) 10 separates the discharged liquid from the condenser 8 into water and oil for feeding out. The solid substance is discharged from the cyclone 7. A discharged hot water from condenser 8 for the vapor may be reused by feeding not only to the condenser as the cooling water of the condenser 8 as set forth above but also to the boiler 1. It should be noted that numerical example in FIG. 1 represents particular example currently considered to be preferred. However, the present invention is not specified to the shown specific numerical values. In the shown embodiment, a mixture of gasoline and solid substance is taken as an example of the oil containing substance.

Figure 2:
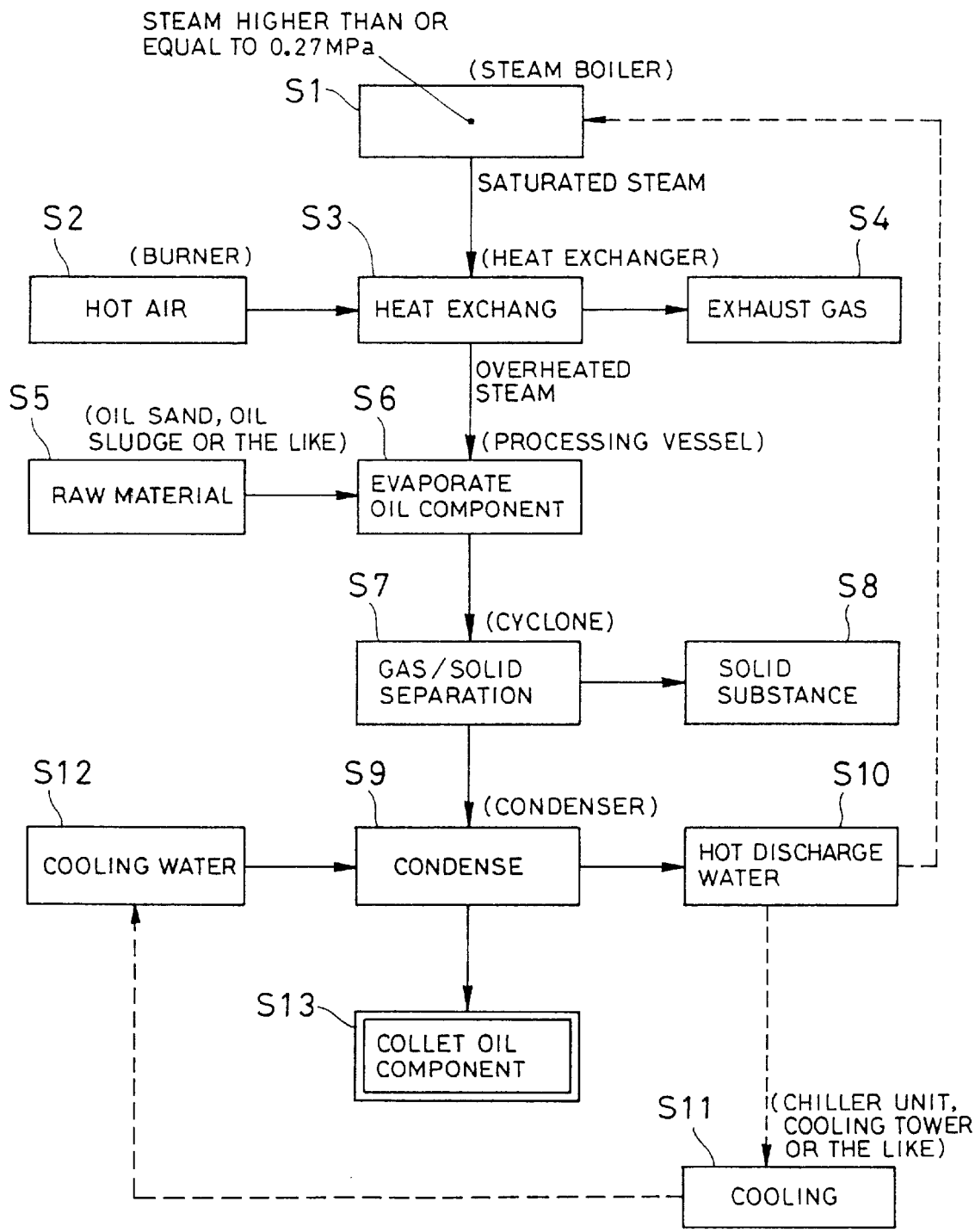
FIG. 2 is a general flowchart showing operation of the preferred embodiment of the oil component separating apparatus according to the present invention.

FIG. 2 is a flowchart showing a process of operation of the shown embodiment of the oil component separating apparatus according to the present invention. By the steam boiler 1, a saturated vapor of 0.27 MPa or more is generated (step S1). In the heat exchanger 3, the saturated vapor is further heated by the head generated by the burner 2 (step S2) to be an overheated vapor of high temperature, i.e. higher than or equal to 300° C. and high pressure (step S3). It should be noted that, at this time, an exhaust gas is discharged by the heat exchanger 3 (step S4).

The overheated vapor is introduced into the processing vessel 6. At this time, the vapor passes through the throat form tapered injection nozzle 61 to generate supersonic flow to be injected into the injection space. In the injection space, the supersonic flow of the overheating vapor is forcedly collided to the oil containing substance supplied from the material feeder 4. Thus, the oil containing substance is instantly crushed and vaporized (step S6).

Output of the processing vessel 6 is supplied to the cyclone 7 to be separated into the gas and solid by centrifugal separation, collision separation or so forth (step S7). At this time, the gas is dispersed in the cyclone and is lead out to the condenser 8, and the solid substance is discharged as it is (step S8). In the condenser 8, vaporized oil and water are returned into liquid phase (step S9). At this time, if the hot water separated and discharged from the condenser 8 is cooled by means of the cooling tower 9 for circulating to re-use as the cooling water of the condenser 8 (steps S10 to S12). On the other hand, the hot water discharged from the condenser 8 may also be re-circulated to the steam boiler 1 for re-use.

Finally, in the separating vessel (separator) 10, water and oil are separated to enable collection of the oil component (step S13). It should be noted that, at some temperature of cooling and distillation through heat exchange process by the condenser 8, it becomes possible to directly separate the water and oil. In such case, the separating vessel (separator) 10 becomes unnecessary.

As set forth above, according to the present invention, by injecting the high temperature and high pressure overheated vapor in the form of the supersonic flow toward the oil containing substance, the oil containing substance is instantly crushed and evaporated. Therefore, a fear for explosion by inflaming of the oil can be successfully avoided. Also, it becomes possible to provide compact and light weight apparatus which can efficiently separate the coil component. Furthermore, since whole system can be filled with vapor, hard scale will never deposit.

On the other hand, the hot discharged water discharged from the condenser can be re-used as the coolant for the condenser per se, or be re-used by re-circulating to the boiler for further improving efficiency. In addition, since the oil is collected with evaporation, the oil which does not contain impurity, can be obtained to permit recycling of resource. Furthermore, upon extracting the crude oil from the oil sand or sludge, in which sand and heavy oil are admixed, thermal decomposition of the heavy oil can be caused due to high temperature heat, a proportion of petroleum oil in the extracted oil component can be increased. While it is uncommercial in the case of less than or equal to 6% of oil content, the present invention may make it profitable even when the oil content is less than or equal to 3%.

Although the present invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. An oil component separating method for an oil containing substance, the method comprising:

a step of injecting a supersonic flow of an overheated vapor toward an oil containing substance supplied externally in an injection space, and forcedly colliding said supersonic flow of the overheated vapor with the supplied oil containing substance;

a step of separating an evaporated component and solid component obtained by injection in said injection space; and a step of collecting the oil component by condensing the evaporated substance.

2. An oil component separating method for the oil containing substance as set forth in claim 1, wherein in said separating step, said solid component is separated and collected by a cyclone or bag filter, said evaporated component is dispersed by said cyclone or bag filter to be supplied to said condensing step, and in said condensing step, said evaporated component is subject to cooling and distillation by heat exchanging process.

3. An oil component separating method for the oil containing substance as set forth in claim 2, wherein the heat exchanging process in said condensing step includes cooling by cooling water, and obtaining a moisture component by the cooling process which is re-used as said cooling water.

4. An oil component separating method for the oil containing substance as set forth in claim 3, further comprising a step of re-using the moisture component obtained by the cooling process for the generating overheated vapor.

* * * * *